United States Patent
Spitler

(10) Patent No.: US 8,419,103 B2
(45) Date of Patent: Apr. 16, 2013

(54) PANEL ASSEMBLY FOR A MOTOR VEHICLE

(75) Inventor: Nicholas Spitler, New Hudson, MI (US)

(73) Assignee: Nissan North America, Inc., Franklin, TN (US)

( * ) Notice: Subject to any disclaimer, the term of this patent is extended or adjusted under 35 U.S.C. 154(b) by 231 days.

(21) Appl. No.: 13/015,112

(22) Filed: Jan. 27, 2011

(65) Prior Publication Data

US 2012/0193933 A1 Aug. 2, 2012

(51) Int. Cl.
*B62D 25/14* (2006.01)

(52) U.S. Cl.
USPC ............................................................ 296/74

(58) Field of Classification Search ............ 296/74, 296/70, 193.02; 381/386, 86; 362/85; 704/258, 704/260, 270
See application file for complete search history.

(56) References Cited

U.S. PATENT DOCUMENTS

| | | | |
|---|---|---|---|
| 5,788,532 A * | 8/1998 | Takiguchi et al. | 439/374 |
| 5,873,749 A * | 2/1999 | Takiguchi et al. | 439/534 |
| 6,119,060 A * | 9/2000 | Takayama et al. | 701/36 |
| 6,629,716 B2 * | 10/2003 | Shibata et al. | 296/70 |
| 6,709,041 B1 * | 3/2004 | Hotary et al. | 296/70 |
| 7,021,691 B1 * | 4/2006 | Schmidt et al. | 296/70 |
| 7,036,865 B2 * | 5/2006 | Sato et al. | 296/70 |
| 7,210,725 B2 * | 5/2007 | Moore | 296/37.8 |
| 7,401,835 B2 * | 7/2008 | Gresham et al. | 296/70 |
| 7,425,891 B2 * | 9/2008 | Colburn et al. | 340/438 |
| 7,597,377 B2 * | 10/2009 | Sutou et al. | 296/70 |
| D613,653 S * | 4/2010 | Moneypenny et al. | D12/192 |
| 8,322,769 B2 * | 12/2012 | Kuhlmann | 296/24.34 |
| 2004/0190742 A1 * | 9/2004 | Sugiura et al. | 381/334 |
| 2007/0144291 A1 * | 6/2007 | Tanner | 74/473.3 |
| 2008/0180963 A1 * | 7/2008 | Clauw et al. | 362/489 |
| 2009/0015031 A1 * | 1/2009 | Sato et al. | 296/70 |
| 2009/0146446 A1 * | 6/2009 | Sutou et al. | 296/70 |
| 2009/0274483 A1 * | 11/2009 | Kim | 399/107 |
| 2012/0187722 A1 * | 7/2012 | Dawe et al. | 296/191 |

* cited by examiner

*Primary Examiner* — Kiran B Patel
(74) *Attorney, Agent, or Firm* — Young Basile Hanlon & MacFarlane P.C.

(57) ABSTRACT

A panel assembly includes an audio panel and a finisher panel. The audio panel has a base portion, a support portion, and an accent portion. The accent portion is adjacent to the base portion and the support portion. The finisher panel is connected to the audio panel such that a lateral edge of the finisher panel is adjacent to the base portion of the audio panel, a side edge of the finisher panel is adjacent to the accent portion of the audio panel, and the support portion is concealed by the finisher panel.

10 Claims, 6 Drawing Sheets

PANEL ASSEMBLY FOR A MOTOR VEHICLE

TECHNICAL FIELD

The disclosure relates to the field of interior panels for motor vehicles.

BACKGROUND

Interior trim panel design for motor vehicles requires consideration of numerous competing priorities. An area of particular concern is the center stack, which is a portion of the instrument panel of the vehicle that is located between the driver and passenger of the vehicle, and which typically houses audio controls, climate controls and other vehicle controls. Due to the prominence of the center stack, aesthetic considerations are especially important. Due to its complexity, however, accommodating a designer's aesthetic desires is often difficult.

Due to assembly considerations, the center stack area of an instrument panel is typically assembled from multiple panels that must be installed with respect to the instrument panel in a specific order. As a result of the use of multiple panels, aesthetic elements such as contrasting or metallic accents often span multiple panels. This sometimes causes misalignment between the portions of the accents as a result of design and installation tolerances. This misalignment can be especially noticeable in these accent areas, since they are highly visible.

In light of the foregoing, need remains for improvement in panel assemblies for motor vehicles.

SUMMARY

Panel assemblies for motor vehicles and center stack assemblies incorporating the panel assemblies are taught herein.

One panel assembly taught herein includes an audio panel and a finisher panel. The audio panel has a base portion, a support portion, and an accent portion. The accent portion is adjacent to the base portion and the support portion. The finisher panel is connected to the audio panel such that a lateral edge of the finisher panel is adjacent to the base portion of the audio panel, a side edge of the finisher panel is adjacent to the accent portion of the audio panel, and the support portion is concealed by the finisher panel.

Another panel assembly taught herein includes an instrument panel, an audio panel, and a finisher panel. The instrument panel has a center stack opening defined between a first side edge and a second side edge. The audio panel is disposed within the center stack opening of the instrument panel. The audio panel has a base portion, a support portion, a first accent portion and a second accent portion.

The base portion of the audio panel and the support portion of the audio panel are separated by a lateral edge of the audio panel.

The first accent portion of the audio panel is positioned adjacent to the first side edge of the instrument panel such that the base portion is spaced from the instrument panel by the first accent portion. The first accent portion of the audio panel includes a first groove and a first accent surface. A first portion of the first groove is disposed between the first accent surface and the base portion. A second portion of the first groove is disposed between the first accent surface and the support portion.

The second accent portion is positioned adjacent to the second side edge of the instrument panel such that the base portion is spaced from the instrument panel by the second accent portion. The second accent portion includes a second groove and a second accent surface. A first portion of the second groove is disposed between the second accent surface and the base portion. A second portion of the second groove is disposed between the second accent surface and the support portion.

The finisher panel is connected to the audio panel such that a lateral edge of the finisher panel is adjacent to the lateral edge of the audio panel. A first side edge of the finisher panel is adjacent to the first groove of the first accent portion of the audio panel. A second side edge of the finisher panel is adjacent to the second groove of the second accent portion of the audio panel. The support portion of the audio panel is concealed by the finisher panel.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
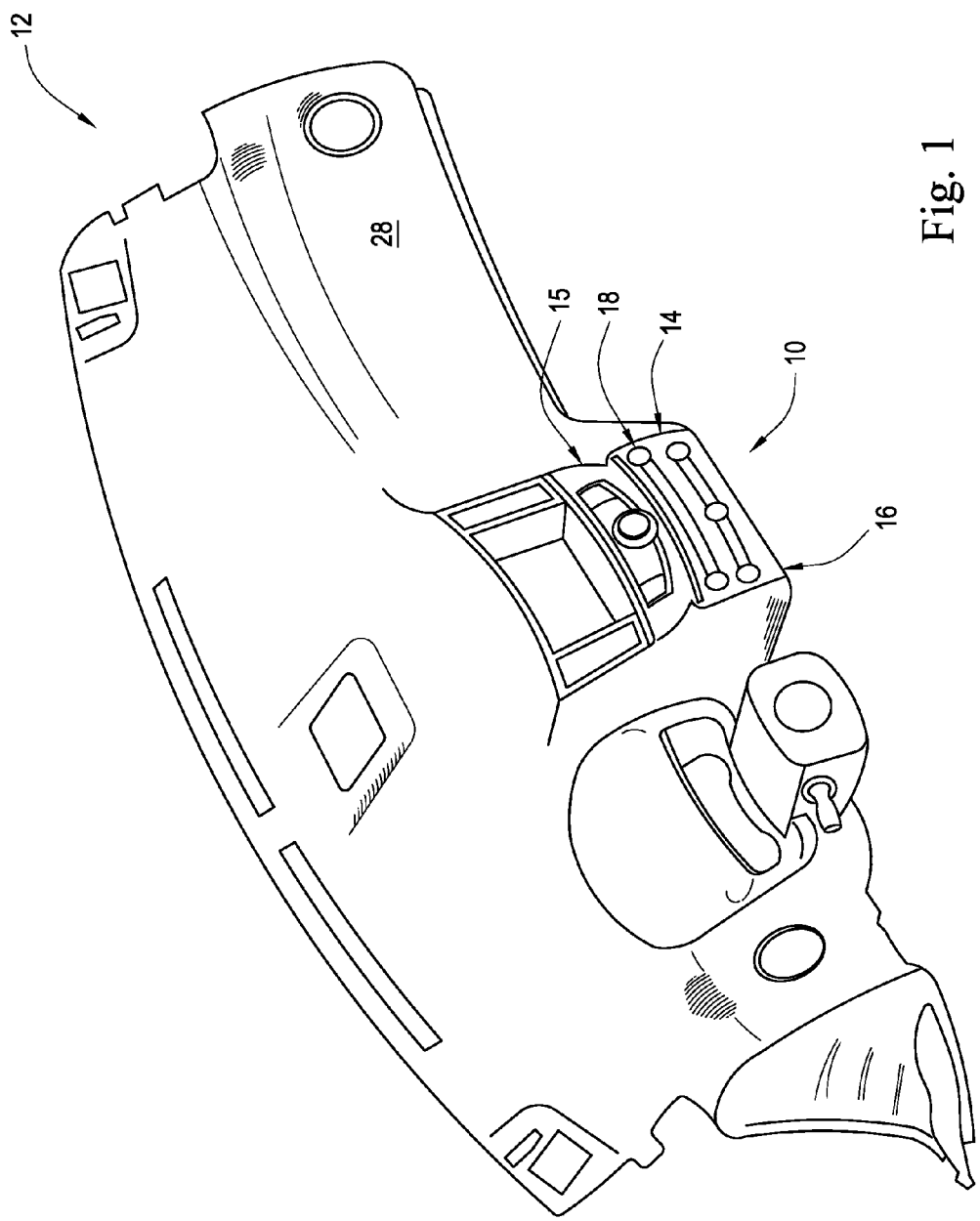
FIG. 1 is a perspective view of an instrument panel of a motor vehicle.
Figure 2:
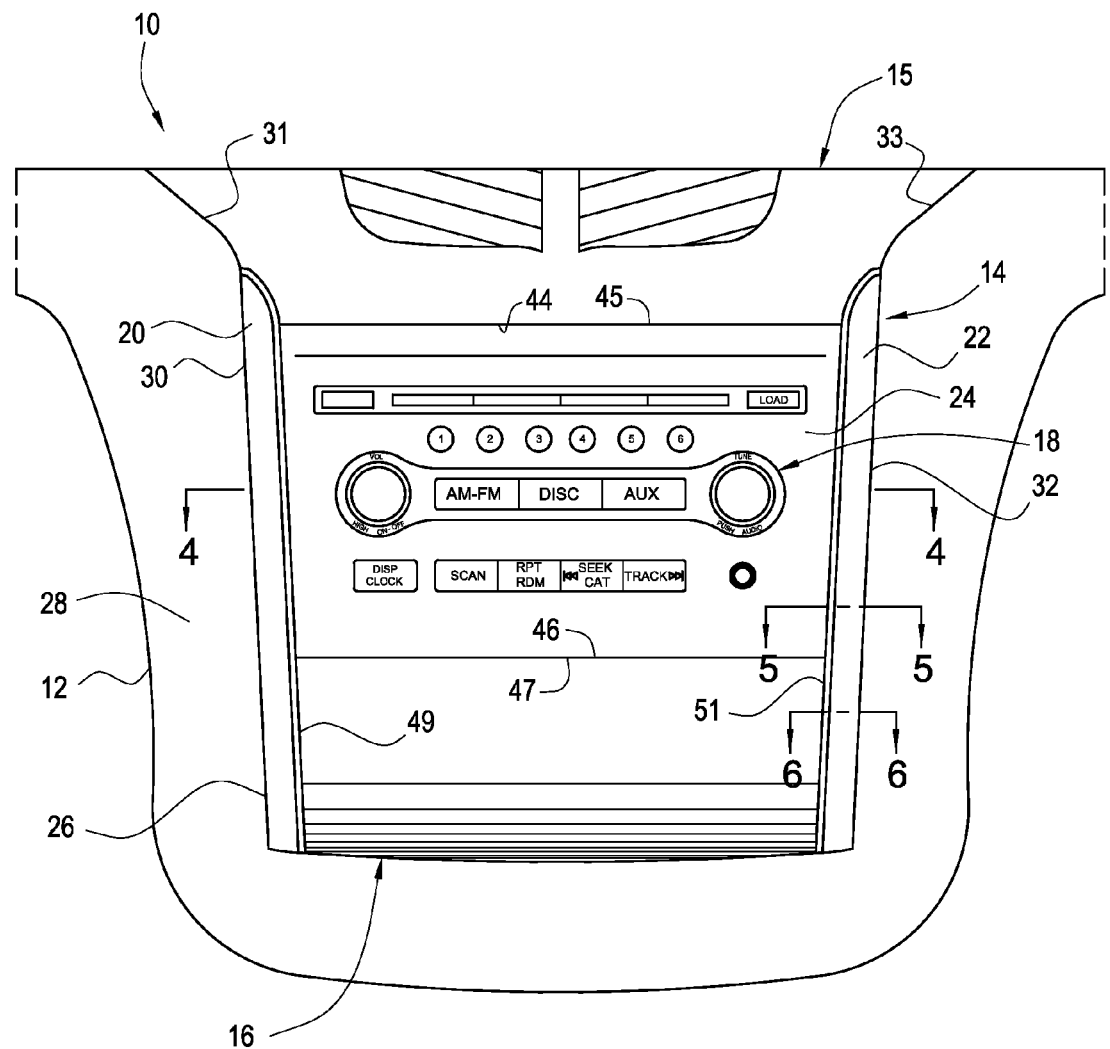
FIG. 2 is a front view showing a center stack assembly of the instrument panel of the motor vehicle incorporating a panel assembly.

FIGS. 1-2 show a center stack assembly 10 and an instrument panel 12 of a motor vehicle. The center stack assembly 10 is connected to the instrument panel 12, and includes an audio panel 14, an upper finisher panel 15, and a lower finisher panel 16. An audio head unit 18 is connected to the audio panel 14. The audio panel 14 includes a first accent portion 20 and a second accent portion 22 that spaces a base portion 24 of the audio panel 14 and the lower finisher panel 16 from the instrument panel 12.

The instrument panel 12 defines a center stack opening 26 in which the center stack assembly 10 is disposed. The instrument panel 12 has an exposed outer surface 28. The center stack opening 26 is defined between a first side edge 30 and a second side edge 32 that both border the center stack opening 26 and the outer surface 28 of the instrument panel 12.

The lower finisher panel 16 is positioned below the base portion 24 of the audio panel 14, and is disposed between the first accent portion 20 and the second accent portion 22 of the audio panel 14. The lower finisher panel 16 includes an upper edge 47, a first side edge 49, and a second side edge 51. The upper edge 47 extends from the first side edge 49 to the second side edge 51 in a cross-car direction. The lower finisher panel 16 is connected to the audio panel 14 such that the upper edge 47 of the lower finisher panel 16 is adjacent to the base portion 24 of the audio panel 14, the first side edge 49 of the lower finisher panel 16 is adjacent to the first accent portion 20 of the audio panel 14, and the second side edge 51 of the lower finisher panel 16 is adjacent to the second accent portion 22 of the audio panel 14.

The upper finisher panel 15 is positioned above the base portion 24 of the audio panel 14, and is disposed at least partially between the first accent portion 20 and the second accent portion 22 of the audio panel 14. The upper finisher panel 15 includes a lower edge 45, a first side edge 31, and a second side edge 33. The lower edge 45 extends from the first side edge 31 to the second side edge 33 in a cross-car direction. The upper finisher panel 15 is connected to the audio panel 14 such that the lower edge 45 of the upper finisher panel 15 is adjacent to the base portion 24 of the audio panel, the first side edge 31 of the upper finisher panel 15 is adjacent to the first accent portion 20 of the audio panel 14, and the second side edge 33 of the upper finisher panel 15 is adjacent to the second accent portion 22 of the audio panel 14.

Figure 3:
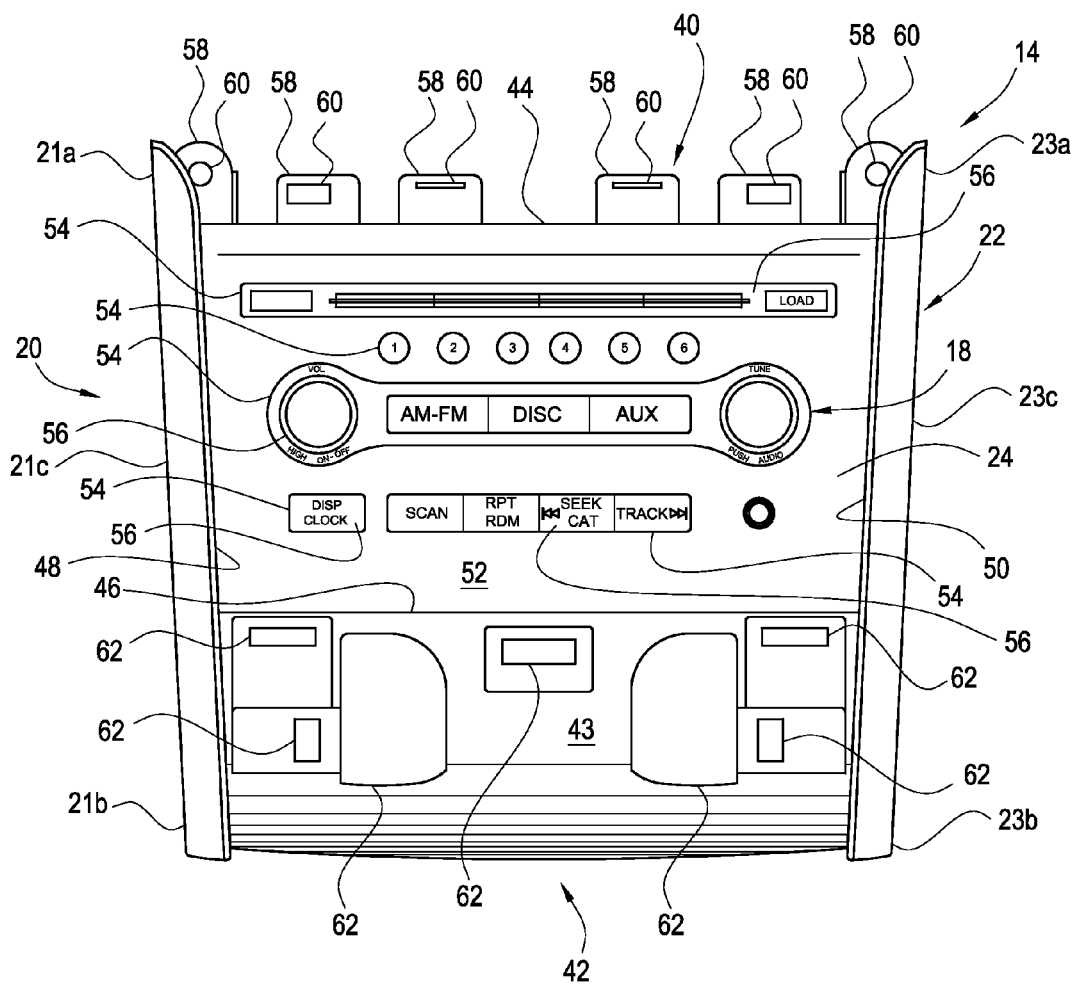
FIG. 3 is a front view showing the panel assembly.

As shown in FIG. 3, the audio panel 14 includes the base portion 24, the first accent portion 20, the second accent portion 22, a first support portion 40 and a second support portion 42. The audio panel 14 can be fabricated from plastics or similar materials, such as by injection molding. Accordingly, the audio panel 14 could be a substantially rigid structure. In addition, the audio panel 14 could be fabricated as a unitary structure. One or more of the portions of the audio panel 14 could be painted to provide one or more desired surface finishes on the audio panel 14, as will be described in detail herein.

The base portion 24 of the audio panel 14 is exposed when the center stack assembly 10 is fully assembled. The base portion 24 is bounded by an upper lateral edge 44, a lower lateral edge 46, a first side edge 48, and a second side edge 50. An exposed surface 52 of the base portion 24 is defined in the area bounded by the upper lateral edge 44, the lower lateral edge 46, the first side edge 48, and second side edge 50.

The upper lateral edge 44 of the base portion 24 is formed adjacent to the first support portion 40 of the audio panel 14. The lower lateral edge 46 of the base portion 24 is formed adjacent to the second support portion 42 of the audio panel 14. Both the upper lateral edge 44 and the lower lateral edge 46 of the base portion 44 extend in a cross-car direction from the first side edge 48 to the second side edge 50 of the base portion 24. When assembled, the lower lateral edge 45 of the first finisher panel 15 and the upper lateral edge 44 of the audio panel 14 are substantially co-extensive. Likewise, the upper lateral edge 47 of the second finisher panel 16 and the lower lateral edge 46 of the audio panel 14 are substantially co-extensive when assembled.

The first side edge 48 of the base portion 24 is adjacent to the first accent portion 20 of the audio panel 14. The second side edge 50 of the base portion 24 is opposite the first side edge 48, and is disposed adjacent to the second accent portion 22 of the audio panel 14.

One or more control openings 54 are formed through the base portion 24 of the audio panel 14. When the center stack assembly 10 is assembled, a plurality of audio controls 56 of the audio head unit 18 are received in the control openings 54. The control openings 54 may be located, for example, at locations that are spaced from the upper lateral edge 44, the lower lateral edge 46, the first side edge 48 and the second side edge 50 of the base portion 24, as shown in the illustrated embodiment.

The first support portion 40 is located adjacent to the upper lateral edge 44 of the base portion 24 of the audio panel 14. The first support portion 40 is recessed with respect to the base portion 24, the first accent portion 20, and the second accent portion 22 of the audio panel 14. In particular, the illustrated example, the first support portion 40 includes a plurality of support tabs 58 having apertures 60 defined therethrough. The support tabs 58 are recessed with respect to the base portion 24 of the audio panel 14.

The apertures 60 defined by the first support portion 40 may be configured to receive clips therein, may be configured to receive fasteners for connecting the audio panel 14 to the instrument panel 12 or the audio head unit 18, or may be configured as access cutouts for accessing fasteners that secure the audio head unit 18 with respect to the instrument panel 12. In addition to being defined adjacent to the upper lateral edge 44 of the base portion 24 of the audio panel 14, the first support portion 40 is also positioned between the first accent portion 20 and the second accent portion 22.

The second support portion 42 of the audio panel 14 is positioned adjacent to the lower lateral edge 46 of the base portion 24, between the first accent portion 20 and the second accent portion 22. The second support portion 42 is recessed with respect to the exposed surface 52 of the base portion 24 and is also recessed with respect to the first accent portion 20 and the second accent portion 22 of the audio panel 14. For example, the second support portion 42 could include a base surface 43 that is recessed with respect to the exposed surface 52 of the base portion 24, the first accent portion 20 and the second accent portion 22.

The second support portion 42 defines a plurality of apertures 62 that are formed through the base surface 43 of the second support portion 42. The apertures 62 could be configured to receive clips, could be configured to receive fasteners that connect the audio panel 14 to the instrument panel 12 or the audio head unit 18, or could be configured as access cutouts that provide access to fasteners that connect the audio head unit 18 to the instrument panel 12.

The first support portion 40 and the second support portion 42 could take forms other than the ones illustrated herein. For example, the first support portion 40 could be provided with structure similar to the base surface 43 and the apertures 62 of the second support portion. Similarly, the second support portion 42 could be provided with structure similar to the support tabs 58 and apertures 60 of the first support portion 42.

The first accent portion 20 is formed integrally with the base portion 24, the first support portion 40, and the second support portion 42 of the audio panel 14. The first accent portion 20 is disposed adjacent to a first side edge 48 of the base portion 24. When assembled with respect to the instrument panel 12, the first accent portion 20 is also disposed adjacent to the first side edge 30 of the center stack opening 26 of the instrument panel 12. Accordingly, the first accent portion 20 spaces the outer surface 28 of the instrument panel 12 from the first support portion 40, the second support portion 42, and the base portion 24 of the audio panel 14, including the exposed surface 52 of the base portion 24 of the audio panel 14.

Figure 4:
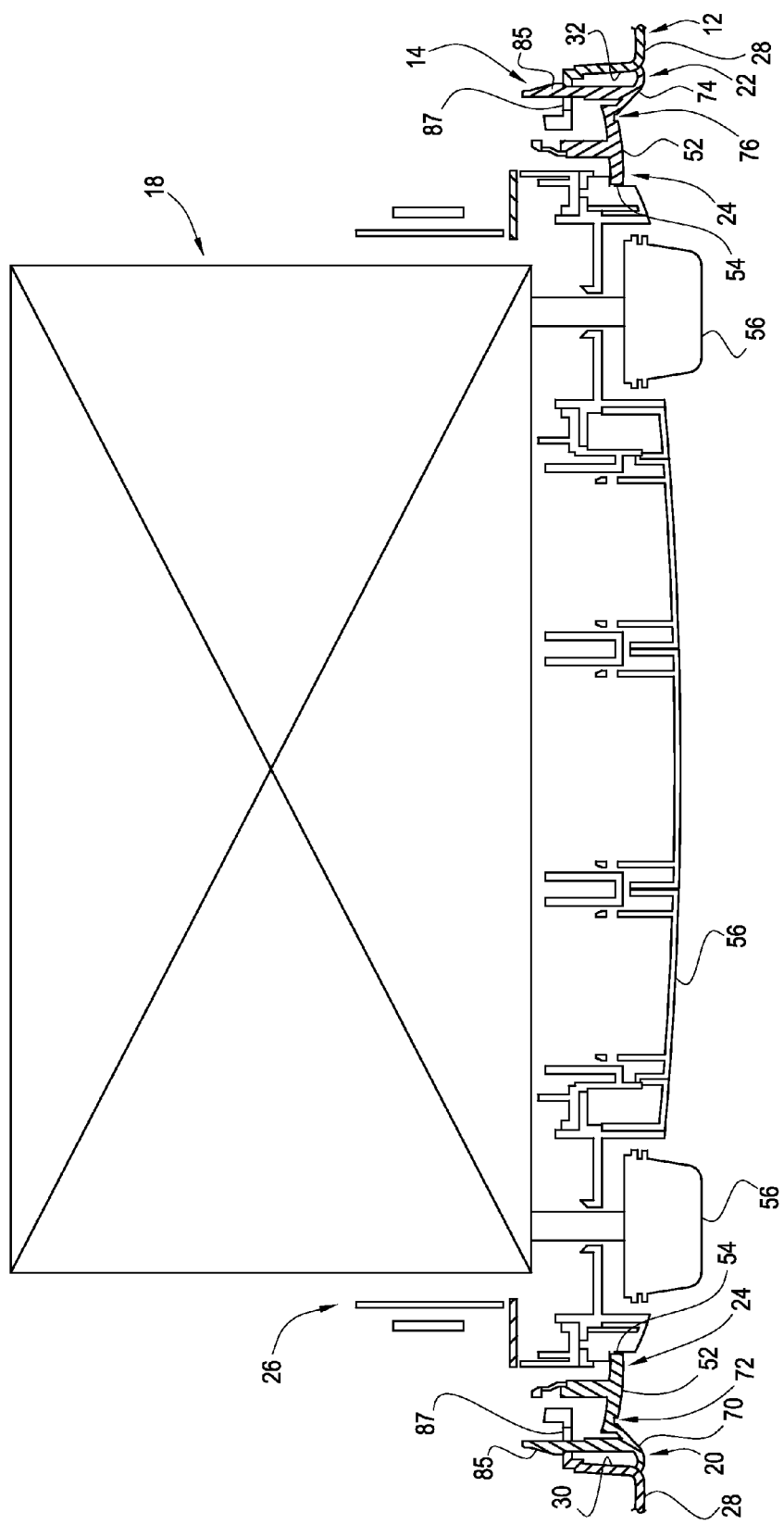
FIG. 4 is a top, cross-section view taken along line 4-4 of FIG. 2.
Figure 5:
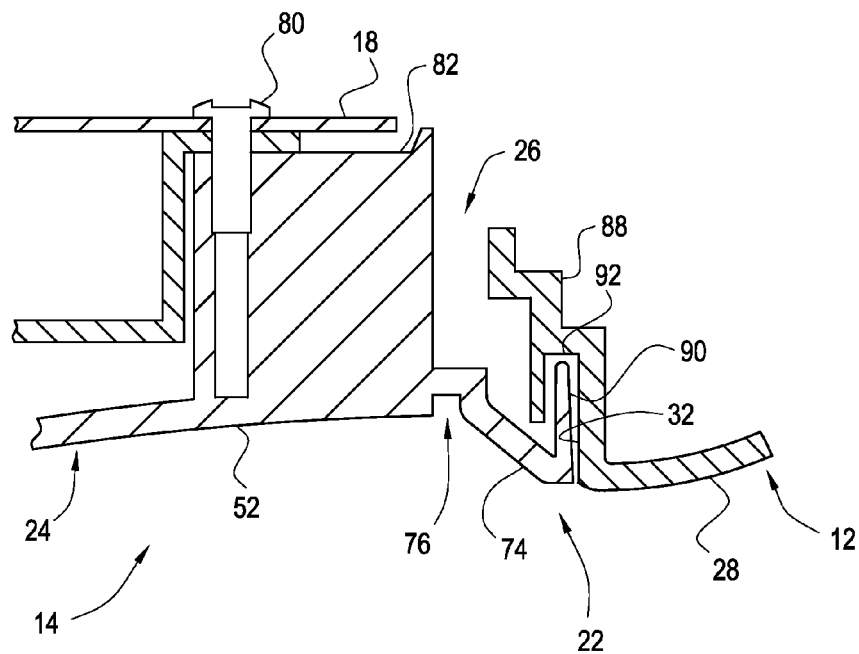
FIG. 5 is a top, cross-section view of the center stack assembly taken at line 5-5 of FIG. 2.
Figure 6:
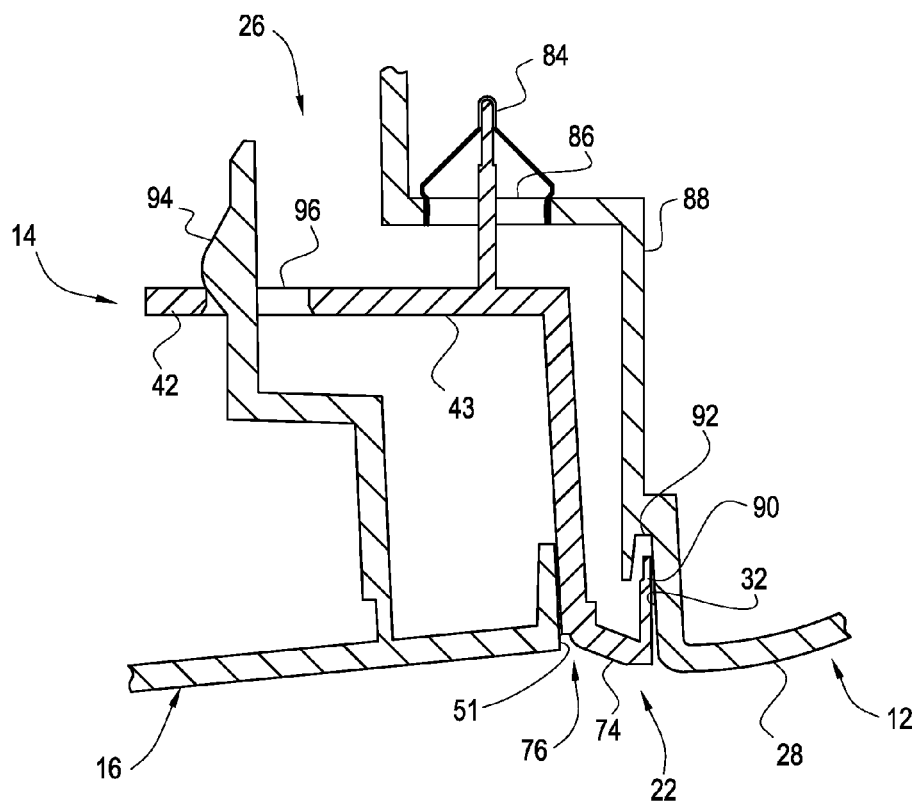
FIG. 6 is a top, cross-section view of the center stack assembly taken at line 6-6 of FIG. 2.

The first accent portion 20 is defined by one or more exposed surfaces, as best shown in FIGS. 4-6. For example, in the illustrated embodiment, the first accent portion 20 includes a first accent surface 70 and a first groove 72. The first accent surface 70 is disposed adjacent to the first side edge 30 of the center stack opening 26 of the instrument panel 12. The first groove 72 of the first accent portion 20 is disposed adjacent to the first support portion 40, the second support portion 42, and the first side edge 48 of the base portion 24 of the audio panel 14. Also, in the illustrated embodiment, the first groove 72 extends the entire length of the first accent portion 20, and spaces the first accent surface 70 apart from the exposed surface 52 of the base portion 24 of the audio panel 14. The first groove 72 extends substantially transverse to the upper lateral edge 44 and the lower lateral edge 46 of the base portion 24 of the audio panel 14.

The first accent surface 70 could be angled with respect to the exposed surface 52 of the base portion 24 of the audio panel 14 and with respect to the outer surface 28 of the instrument panel 12. For example, the exposed surface 52 of the base portion 24 of the audio panel 14 could be recessed with respect to the outer surface 28 of the instrument panel 12, at least in the area adjacent to the first groove 72. By angling the first accent surface 70 with respect to the outer surface 28 and the exposed surface 52, a continuous surface contour is established across the instrument panel 12 and the audio panel 14. Also, angling the first accent surface 70 with respect to the exposed surface 52 enhances the appearance that the first accent surface 70 and the base portion 24 of the audio panel 14 are separate panels.

The second accent portion 22 is positioned between the second side edge 32 of the center stack opening 26 of the instrument panel 12 and the second side edge 50 of the base portion 24 of the audio panel 14. The second accent portion 22 is fabricated as an integral, unitary structure with the base portion 24, the first support portion 40, and the second support portion 42 of the audio panel 14. The second accent portion 22 includes a second accent surface 74 and a second groove 76. Aside from being formed at a location on the audio panel 14 that is opposite the first accent portion 20, the second accent portion 22 is identical in structure to the first accent portion 20.

The first accent portion 20 and the second accent portion 22 could each include one or more surface finishes that contrast with respect to the surface finishes of the instrument panel 12 and/or the exposed surface 52 of the base portion 24 of the audio panel 14 as well as the upper finisher panel 15 and the lower finisher panel 16. For example, the first accent surface 70 of the first accent portion 20 and the second accent surface 74 of the second accent portion 22 could each be painted to resemble metal, and the exposed surface 52 of the base portion 24 of the audio panel 14 could be painted in a desired contrasting color. Other surface finishes and combinations of surface finishes could be provided, including unpainted surface finishes, textured surface finishes, and veneered surface finishes.

The first groove 72 of the first accent portion 20 and the second groove 76 of the second accent portion could each be colored to resemble a panel gap. This enhances the appearance that the first accent portion 20 and the base portion 24 of the audio panel 14 are separate panels. This can be done, for example, by molding the audio panel 14 using a material having a base coloration, which can be a coloration that is desired for the first groove 72 and the second groove 76. Masks (not shown) can then be applied to portions of the audio panel 14 while the remainder of the audio panel 14 is painted as desired. One example of a mask can have flanges that extend into the first groove 72 of the first accent portion 20 and the second groove 76 of the second accent portion 22 with a body that overlies the base portion 24 of the audio panel 14 to shield the base portion 24, the first groove 72, and the second groove 76 from being painted while painting the first accent surface 70 of the first accent portion 20 and the second accent surface 74 of the second accent portion 22. Another example of a mask can have a first flange that extends into the first groove 72, a second flange that extends along an outside edge of the first accent portion 20, and a body portion that overlies the first accent portion 20 to shield the first accent surface 70 and the first groove 72 from being painted while painting the base portion 24. Naturally, a similar mask can be applied to the second accent portion 22 to shield the second accent surface 74 and the second groove 76 from being painted while painting the base portion 24.

The combination of the surface finishes of the first accent surface 70, the first gap 72, the second accent surface 74, the second groove 76 and the exposed surface 52 of the base portion 24 causes the first accent portion 20 and the second accent portion 22 to appear as if they are formed separately from the remainder of the audio panel 14. Thus, the first accent portion 20, the second accent portion 22, and the base portion 24 appear to be separate panels.

This illusion that the first and second accent portions 20, 22 are separate from the remainder of the audio panel 14 is enhanced by the fact that an upper end portion 21a of the first accent portion 20 extends upward past the upper lateral edge 44 of the base portion 24 of the audio panel 14 while a lower end portion 21b of the first accent portion 20 extends downward past the lower lateral edge 46 of the base portion 24 of the audio panel 14. Similarly, an upper end portion 23a of the second accent portion 22 extends upward past the upper lateral edge 44 of the base portion 24 of the audio panel 14 while a lower end portion 23b of the second accent portion 22 extends downward past the lower lateral edge 46 of the base portion 24 of the audio panel 14.

The upper end portions 21a, 23a and the lower end portions 21b, 23b of the first and second accent portions 20, 22 extend from respective central portions 21c, 23c of the first and second accent portions 20, 22. The central portions 21c, 23c of the first and second accent portions 20, 22 are disposed adjacent to the base portion 24 of the audio panel 14. Preferably, at least a portion of the first support portion 40, such as tabs 58 or a base surface similar to base surface 43 of the second support portion 42, is integrally formed with upper end portions 21a, 23a of the first and second accent portions 20, 22. Similarly, at least a portion of the second support portion 42, such as base surface 43 or tabs similar to tabs 58 of the first support portion 40, is preferably formed integrally with lower end portions 21b, 23b of the first and second accent portions 20,22. Integrally forming the tabs and/or base surface with upper end portions 21a, 23a and lower end portions 21b, 23b of the first and second accent portions 20, 22 provides rigidity to resist deformation of the upper end portions 21a, 23a and lower end portions 21b, 23b.

The first groove 72 is positioned between the first accent surface 70 and the first support portion 40 at the upper end portion 21a of the first accent portion 20, the first groove 72 is positioned between the first accent surface 70 and the base portion 24 at the central portion 21c of the first accent portion 20, and the first groove 72 is positioned between the first accent surface 70 and the second support portion 42 at the lower end portion 21b of the first accent portion 20. Accordingly, portions of the first groove 72 corresponding to the portions 21a-21c of the first accent portion 20 meet one another at the upper and lower lateral edges 44, 46 of the base portion 24 of the audio panel 14.

The second groove 76 is positioned between the second accent surface 74 and the first support portion 40 at the upper end portion 23a of the second accent portion 22, the second groove 76 is positioned between the second accent surface 74 and the base portion 24 at the central portion 23c of the second accent portion 22, and the second groove 76 is positioned between the second accent surface 74 and the second support portion 42 at the lower end portion 23b of the second accent portion 22. Accordingly, portions of the second groove 76 corresponding to the portions 21a-21c of the first accent portion 20 meet one another at the upper and lower lateral edges 44, 46 of the base portion 24 of the audio panel 14.

Continuation of the first and second accent portions 20, 22 above and below the base portion 24 of the audio panel 14 provides a consistent appearance for the first and second accent portions 20, 22 along the sides of the upper finisher panel 15, the audio panel 14, and the lower finisher panel 16.

Figure 7:
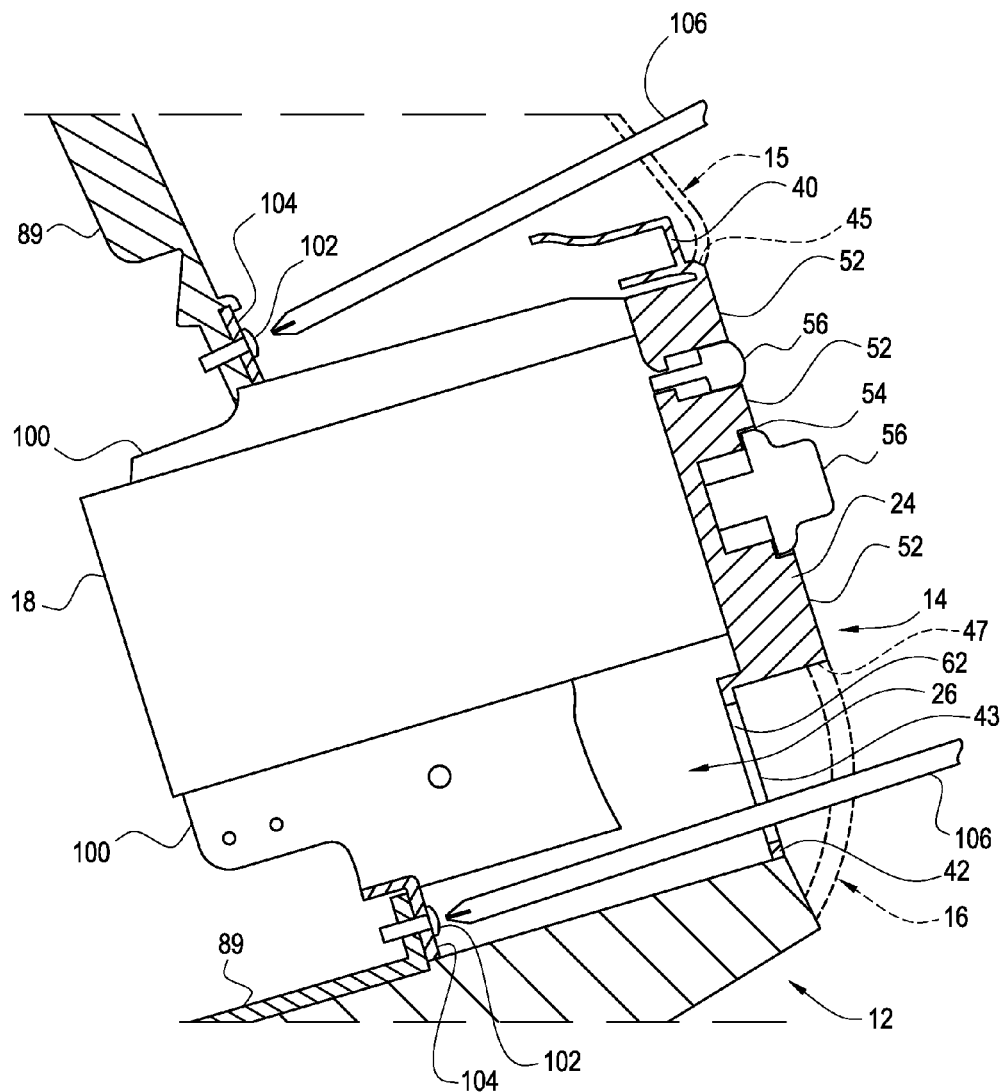
FIG. 7 is a side, cross-section view of the center stack assembly showing fastening of an audio head unit with respect to the instrument panel using a tool.

As shown in FIG. 5, the audio head unit 18 and the audio panel 14 could be assembled with respect to each other prior to installation of the assembled audio head unit 18 and audio panel 14 with respect to the instrument panel 12. This could be accomplished, for example, using fasteners 80 that connect the audio head unit 18 to an interior surface 82 of the audio panel 14. The audio panel 14 and the audio head unit 18 can be supported by connection of the audio head unit 18 to a support structure 89, as shown in FIG. 7. The support structure 89 is a rigid structure that is either rigidly or semi-rigidly connected to the body of the vehicle to provide a secure connection of the audio head unit 18 to the body of the vehicle. For example, the support structure 89 could be a bracket or frame member that is connected to the body of the vehicle. Alternatively, the support structure 89 could comprise a portion of the body of the vehicle.

Because the audio head unit 18 can be connected to the audio panel 14 prior to installation of the audio panel 14 with respect to the instrument panel 12, the audio panel 14 is configured to allow the audio head unit 18 to be fastened with respect to the support structure 89 after the audio panel 14 and the audio head unit 18 are disposed within the center stack opening 26 of the instrument panel 12. For example, the audio head unit 18 can be supported by an audio bracket 100. A single audio bracket 100 may be utilized, or multiple audio brackets 100 may be utilized to support the audio head unit 18. The audio head unit 18 is connected to the audio bracket 100 by any conventional structure.

The audio bracket 100 is connected to the support structure 89 using fasteners 102, such as screws, that extend through attachment flanges 104 that are formed on the audio bracket 100. The fasteners 102 are positioned such that they may be accessed using tools 106, such as screwdrivers, when the upper finisher panel 15 and the lower finisher panel 16 are not connected to the audio panel 14. Access to the fasteners 102 may be further accommodated by one or more of the apertures 60 in the first support portion 40 (not shown in FIG. 7), as well as by one or more of the apertures 62 in the second support portion 42.

A plane along which the upper support portion 40 is at least partially located is defined between and extends from the upper end portion 21a of the first accent panel 20 and the upper end portion 23a of the second accent panel 22. At least a portion of the upper finisher panel 15 could also be located along the plane defined between the upper end portions 21a, 23a of the accent panels 20, 22. At least a portion of the attachment tool 106 passes through the plane defined between the upper end portions 21a, 23a of the accent panels 20, 22 in order to access one or more of the fasteners 102 that attach the audio head unit 18 to the support structure 89 above the audio head unit 18. The center stack assembly could be configured such that the only way to access the fasteners 102 that attach the audio head unit 18 to the support structure 89 above the audio head unit 18 is by passing the tool 106 through the plane defined between the upper end portions 21a, 23a of the accent panels 20, 22.

A plane along which the lower support portion 42 is at least partially located is defined between and extends from the lower end portion 21b of the first accent panel 20 and the lower end portion 23b of the second accent panel 22. At least a portion of the lower finisher panel 16 could also be located along the plane defined between the lower end portions 21b, 23b of the accent panels 20, 22. At least a portion of the attachment tool 106 passes through the plane defined between the lower end portions 21b, 23b of the accent panels 20, 22 in order to access one or more of the fasteners 102 that attach the audio head unit 18 to the support structure 89 below the audio head unit 18. The center stack assembly could be configured such that the only way to access the fasteners 102 that attach the audio head unit 18 to the support structure 89 below the audio head unit 18 is by passing the tool 106 through the plane defined between the lower end portions 21b, 23b of the accent panels 20, 22.

As shown in FIG. 6, the audio panel 14 and the instrument panel 12 can be interconnected for fit and finish. For example, a first fastening structure 84 can be provided on either or both of the first support portion 40 and the second support portion 42 of the audio panel 14 for engagement with a second fastening structure 86 that is formed on an interior portion 88 of the instrument panel 12. The first fastening structure 84 and the second fastening structure 86 may be any suitable pair of fastening structures. Similarly, a third fastening structure 85 can be provided on either or both of the first accent panel 20 and the second accent panel 22 of the audio panel 14 for engagement with a fourth fastening structure 87 that is formed on the interior portion 88 of the instrument panel 12, as shown in FIG. 4. The third fastening structure 85 and the fourth fastening structure 87 may be any suitable pair of fastening structures.

By way of example, the first fastening structure 84 and the second fastening structure 86 could be a clip and a corresponding clip opening, a screw and an aperture, a tab and a corresponding opening, or any other suitable pair of fastening structures. Furthermore, inwardly extending flanges 90 could be provided on the audio panel 14, extending inward from the first accent surface 70 and the second accent surface 74 such that they are concealed when the center stack assembly 10 is assembled. The flanges 90 could be received within channels 92 that are formed on the interior portion 88 of the instrument panel 12 adjacent to the first side edge 30 and the second side edge 32 of the center stack opening 26 of the instrument panel 12.

With further reference to FIG. 6, the lower finisher panel 16 is connected to the audio panel 14 such that the second support portion 42 thereof is concealed using, for example, a pair of complementary fastening structures such as a fifth fastening structure 94 and a sixth fastening structure 96 may be provided on the lower finisher panel 16 and the second support portion 42, respectively. The fifth fastening structure 94 and the sixth fastening structure 96 may be any suitable pair of fastening structures, including the examples stated with respect to the first fastening structure 84 and the second fastening structure 86. The upper finisher panel 15 is similar in structure to the lower finisher panel 16 and can be connected to the audio panel 14 in a similar manner to conceal the upper support portion 40.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A center stack assembly for a motor vehicle, comprising:
   an instrument panel having a center stack opening defined between a first side edge and a second side edge;

an audio panel that is disposed within the center stack opening of the instrument panel, the audio panel having:
  a base portion,
  a support portion, wherein the base portion and the support portion of the audio panel are separated by a lateral edge of the audio panel,
  a first accent portion that is positioned adjacent to the first side edge of the instrument panel such that the base portion is spaced from the instrument panel by the first accent portion, the first accent portion including a first groove and a first accent surface, wherein a first portion of the first groove is disposed between the first accent surface and the base portion and a second portion of the first groove is disposed between the first accent surface and the support portion, and
  a second accent portion that is positioned adjacent to the second side edge of the instrument panel such that the base portion is spaced from the instrument panel by the second accent portion, the second accent portion including a second groove and a second accent surface, wherein a first portion of the second groove is disposed between the second accent surface and the base portion and a second portion of the second groove is disposed between the second accent surface and the support portion; and
a finisher panel that is connected to the audio panel such that a lateral edge of the finisher panel is adjacent to the lateral edge of the audio panel, a first side edge of the finisher panel is adjacent to the first groove of the first accent portion of the audio panel, a second side edge of the finisher panel is adjacent to the second groove of the second accent portion of the audio panel, and the support portion is concealed by the finisher panel.

2. The center stack assembly of claim 1, wherein the first portion and the second portion of each of the first groove and the second groove meet at the lateral edge of the audio panel.

3. The center stack assembly of claim 2, wherein the lateral edge of the audio panel extends from the first groove to the second groove.

4. The center stack assembly of claim 3, wherein the first groove and the second groove each extend substantially transverse to the lateral edge of the audio panel.

5. The center stack assembly of claim 2, wherein the lateral edge of the finisher panel is adjacent to the lateral edge of the audio panel.

6. The center stack assembly of claim 5, wherein the lateral edge of the finisher panel and the lateral edge of the audio panel are substantially co-extensive.

7. The center stack assembly of claim 1, wherein the finisher panel includes a first fastening structure that is connected to a second fastening structure that is formed on the support portion of the audio panel.

8. The center stack assembly of claim 1, wherein the first accent surface of the first accent portion and the second accent surface of the second accent portion have a different surface finish than the base portion.

9. The center stack assembly of claim 8, wherein the first groove and the second groove are each painted to resemble a panel gap, such that the first accent portion, the second accent portion, and the base portion appear to be separate panels.

10. The center stack assembly of claim 1, further comprising:
  an audio head unit connected to the audio panel.

* * * * *